United States Patent
Reinmuth

(10) Patent No.: US 9,411,154 B2
(45) Date of Patent: Aug. 9, 2016

(54) MICRO-ELECTROMECHANICAL REFLECTOR AND METHOD FOR MANUFACTURING A MICRO-ELECTROMECHANICAL REFLECTOR

(71) Applicant: Robert Bosch GmbH, Stuttgart (DE)

(72) Inventor: Jochen Reinmuth, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 36 days.

(21) Appl. No.: 14/311,760

(22) Filed: Jun. 23, 2014

(65) Prior Publication Data

US 2014/0376069 A1    Dec. 25, 2014

(30) Foreign Application Priority Data

Jun. 24, 2013  (DE) .......................... 10 2013 211 872

(51) Int. Cl.
  *G02B 26/12* (2006.01)
  *G02B 26/08* (2006.01)
(52) U.S. Cl.
  CPC ....... *G02B 26/0841* (2013.01); *Y10T 29/49117* (2015.01)
(58) Field of Classification Search
  CPC ........... G02B 26/0833; G02B 26/0858; G02B 26/085; G02B 26/0841; G02B 26/00; G02B 26/06; G02B 26/08; G02B 6/35; G02B 26/101; B81B 2201/042; B81B 2201/045; H02N 1/008

USPC .......... 359/198.1, 199.2, 200.6, 221.2, 223.1, 359/224.1, 224.2, 226.2, 234, 235, 212.1, 359/212, 2, 213.1, 214.1, 221.1, 298, 872, 359/877, 883, 904; 310/309
See application file for complete search history.

(56) References Cited

U.S. PATENT DOCUMENTS

| | | | |
|---|---|---|---|
| 6,694,504 B2 | 2/2004 | Cho et al. | |
| 7,079,299 B1 | 7/2006 | Conant et al. | |
| 8,107,157 B2 * | 1/2012 | Tsuboi ................. | B81B 3/0078 359/290 |
| 2007/0228869 A1 * | 10/2007 | Aksyuk ............... | G02B 7/1827 310/309 |
| 2008/0284279 A1 * | 11/2008 | Obi .................... | G02B 26/0841 310/309 |
| 2010/0296146 A1 * | 11/2010 | Krastev ............. | G02B 26/0833 359/224.1 |

* cited by examiner

*Primary Examiner* — Stephone B Allen
*Assistant Examiner* — Rahman Abdur
(74) *Attorney, Agent, or Firm* — Norton Rose Fulbright US LLP

(57) ABSTRACT

A micro-electromechanical reflector is described including an electrode substrate having a first surface and a second surface, which is opposite to the first surface, on whose first surface a carrier layer is situated, a plurality of electrode recesses, which are introduced under the carrier layer from the first surface into the electrode substrate, a plurality of second electrode recesses, which are introduced from the second surface into the electrode substrate, at least one torsion spring structure which is formed in the carrier layer over one of the first electrode recesses, a carrier substrate, which is attached to the second surface of the electrode substrate, and a reflector surface, which is situated on the carrier layer.

10 Claims, 14 Drawing Sheets

MICRO-ELECTROMECHANICAL REFLECTOR AND METHOD FOR MANUFACTURING A MICRO-ELECTROMECHANICAL REFLECTOR

FIELD OF THE INVENTION

The present invention relates to a micro-electromechanical reflector and a method for manufacturing a micro-electromechanical reflector, in particular in the field of capacitively operated micro-electromechanical reflectors.

BACKGROUND INFORMATION

Miniaturized mirrors are used for various applications, for example, for optical components in portable telecommunication devices. These mirrors—frequently also called micromirrors—may be manufactured from micro-electromechanical structures (MEMS, "micro-electromechanical systems").

Such micro-mirrors may be based on the capacitive action principle, i.e., a voltage is applied to two electrode elements situated in a predetermined geometry in relation to one another. By varying the voltage, movements of the electrodes in relation to one another may be induced. One of the electrodes is generally fixed on a substrate, while another of the electrodes is freely movable with respect to the substrate at least with respect to one degree of freedom.

In the case of capacitive micro-mirrors, the micro-mirror is typically situated on a substrate and deflected out of the substrate plane via one or more torsion axes. The torsion may be excited via electrodes, which are situated vertically in relation to the substrate, spaced apart from one another, and underneath the micro-mirror. If a control voltage is applied between the electrodes, the electrostatic attraction or repulsion force between the electrodes results in tilting around the torsion axis, which is generally located on the substrate surface, so that the micro-mirror, which lies above it and is mechanically coupled to the tilted electrodes, tilts out of the substrate plane.

The publication U.S. Pat. No. 7,079,299 B1 discloses an electrostatic comb structure in a silicon substrate, which is designed for the purpose of rotating a micro-mirror situated above it around a torsion axis. The publication U.S. Pat. No. 6,694,504 B2 discloses a method for manufacturing a micromirror, whose torsional electrostatic drive structure has electrodes, which are vertically etched in a silicon substrate and are vertically offset in relation to one another.

One problem in the capacitive activation of micro-mirrors is to generate the highest possible torques on the twisting electrodes using the lowest possible voltages. In addition, the micro-mirror is to respond already at low operating voltages between the electrodes and is to have a preferably linear response characteristic between control voltage and generated torque.

There is therefore a demand for micro-mirrors to be capacitively actuated, in particular for capacitively operable micromirrors, which are to be manufactured simply and cost-effectively, the mechanical robustness of which is improved, and which have an improved linear response behavior having a high efficiency ratio between the drive voltage and the torsion torque.

SUMMARY

According to one aspect, the present invention provides a micro-electromechanical reflector including an electrode substrate having a first surface and a second surface, which is opposite to the first surface, on whose first surface a carrier layer is situated, a plurality of electrode recesses, which are introduced under the carrier layer from the first surface into the electrode substrate, a plurality of second electrode recesses, which are introduced from the second surface into the electrode substrate, at least one torsion spring structure, which is implemented in the carrier layer over one of the first electrode recesses, a carrier substrate, which is attached to the second surface of the electrode substrate, and a reflector surface, which is situated on the carrier layer. At least one first electrode, which is movably mounted in the electrode substrate via the torsion spring structure, and at least one second electrode, which is mechanically fixedly anchored to the carrier substrate and/or the carrier layer, are formed by the first and second electrode recesses. Furthermore, at least one first comb structure and at least one second comb structure are formed by the second electrode recesses, the first comb structure being coupled to the first electrode and the second comb structure being coupled to the second electrode. The first and second comb structures have a plurality of comb elements, which are interlocked in the electrode substrate plane and are situated spaced apart from one another and vertically in relation to the electrode substrate plane.

According to another aspect, the present invention provides a method for manufacturing a micro-electromechanical reflector, including the steps of forming first electrode recesses from one first surface into an electrode substrate, attaching a carrier layer to the first surface of the electrode substrate over the plurality of first electrode recesses, forming at least one torsion spring structure in the carrier layer, attaching a carrier substrate to the surface of the electrode substrate facing away from the carrier layer, forming a plurality of second electrode recesses from the second surface into the electrode surface, so that at least one first electrode, which is movably mounted in the electrode substrate via the torsion spring structure, and at least one second electrode, which is mechanically fixedly anchored to the carrier substrate and/or the carrier layer, are formed by the first and second electrode recesses, and at least one first comb structure and at least one second comb structure are formed by the second electrode recesses, the first comb structure being coupled to the first electrode and the second comb structure being coupled to the second electrode, and the first and second comb structures having a plurality of comb elements, which are interlocked in the electrode substrate plane and are situated spaced apart from one another and vertically in relation to the electrode substrate plane, and applying a reflector surface over the carrier layer.

It is one idea of the present invention to provide a capacitively activatable micro-mirror device or reflector device based on a MEMS, in which vertical electrode surfaces are etched out of the electrode substrate and are mechanically anchored on the mirror-side surface of the substrate. The surface opposite to the mirror-side surface is provided with a conduction substrate, via which voltage may be applied to the electrodes. Stationary electrodes, on the one hand, and electrodes movable with respect to the stationary electrodes, on the other hand, are etched out of the electrode substrate. The etching is carried out in two steps: on the one hand, top electrode structures are etched from the mirror-side surface into the substrate; on the other hand, bottom electrode structures are etched from the opposite side into the substrate. This provides sectionally defined electrode structures having offset geometries located in the middle of the substrate, so that the bottom electrode structures may be interlocked like combs, to be able to exert large torques on the top electrode structures and the reflection surface via a long lever in relation to the torsion axis located in the substrate plane.

One substantial advantage of this micro-mirror device is that the electrodes may already be operated with low activation voltage, to be able to exert comparatively high lever actions and correspondingly large torques on the reflector. Due to the interlocking of the comb structures in a plane, the drive has a very good linear drive characteristic. Furthermore, the comb structures may already be overlapped in the zero position, so that a high force is also achievable between the comb structures at low activation voltages.

Such micro-mirror devices may be designed having correspondingly smaller dimensions in the spacing of the electrodes from one another, so that the effective active capacitive electrode surface is increased. A smaller space requirement and a more cost-effective construction thus advantageously result.

According to one specific embodiment of the reflector according to the present invention, the reflector may furthermore have an oxide layer, which is implemented between the carrier layer and the electrode substrate, and at least one electrically conductive via through the carrier layer and the oxide layer, via which the first and/or second electrodes are electrically conductively connected to the carrier layer. This allows the electrical connection of the movable first electrode via the carrier layer to the carrier substrate, without the insulation of the first electrode from the second electrode being compromised.

According to another specific embodiment of the reflector according to the present invention, the carrier substrate may be connected to the electrode substrate via a metallic bonding material. This allows an electrically conductive connection, which is particularly mechanically stable, between the carrier substrate and the electrode substrate.

According to another specific embodiment of the reflector according to the present invention, electrical vias, for example, silicon vias may be implemented through the carrier substrate up to the metallic bonding material from the surface of the carrier substrate facing away from the electrode substrate. The carrier substrate itself may thus advantageously be used as a conductive connection to a rewiring level, which is implementable on the bottom side of the carrier substrate.

According to another specific embodiment of the reflector according to the present invention, the carrier substrate may have silicon vias and, on the surface facing the electrode substrate, an oxide layer which extends laterally beyond the extension of the silicon vias on the carrier substrate in the area of the silicon vias. This substantially increases the mechanical stability of the stationary second electrodes.

According to another specific embodiment of the reflector according to the present invention, at least two first electrodes may be implemented in the electrode substrate, a first of the first electrodes forming a frame structure, within which a second of the first electrodes forms an electrode which is gimbal-mounted via two torsion spring structures. A high deflection of the reflector surface is possible with a low potential difference between the comb structures due to the gimbal mounting.

According to another specific embodiment of the reflector according to the present invention, furthermore at least one third comb structure and at least one fourth comb structure may be formed by the second electrode recesses, the first comb structure being coupled to the first of the first electrodes and the second comb structure being coupled to the second of the first electrodes, and the third and fourth comb structures having a plurality of comb elements, which are interlocked in the electrode substrate plane and are situated spaced apart from one another and vertically in relation to the electrode substrate plane.

According to another specific embodiment of the reflector according to the present invention, a metallic bonding material, a spacer connected to the metallic bonding material, and a mirror element situated on the spacer may be applied to the carrier layer, the reflector surface being applied to the side of the mirror element facing away from the spacer. The reflector surface may thus advantageously be enlarged, without trade-offs having to be accepted in the free movement, i.e., tilting freedom of the reflector.

According to another specific embodiment of the reflector according to the present invention, the mirror element may have a lateral extension which extends beyond the torsion spring structure in the substrate plane of the electrode substrate.

According to another specific embodiment of the reflector according to the present invention, the carrier substrate and/or the electrode substrate may have SOI substrates. Using such substrates, the required oxide layers for the potential separation of the electrodes are already provided, so that the manufacturing method for the reflector advantageously becomes simpler, shorter, and more cost-effective.

Further features and advantages of specific embodiments of the present invention result from the following description with reference to the appended drawings.

BRIEF DESCRIPTION OF THE DRAWINGS

The described embodiments and refinements may be arbitrarily combined with one another, if reasonable. Further possible embodiments, refinements, and implementations of the present invention also include combinations, which are not explicitly mentioned, of features of the present invention described beforehand or hereafter with respect to the exemplary embodiments.

The appended drawings are to provide further understanding of the specific embodiments of the present invention. They illustrate specific embodiments and are used in conjunction with the description to explain principles and concepts of the present invention. Other specific embodiments and many of the mentioned advantages result in consideration of the drawings. The elements of the drawings are not necessarily shown true to scale to one another. Direction specifications such as "left", "right", "top", "bottom", "above", "below", "adjacent to", "in front of", "behind", "vertical", "horizontal", or the like are only used for explanatory purposes in the following description and do not represent a restriction of the generality.

DETAILED DESCRIPTION

Figure 1:
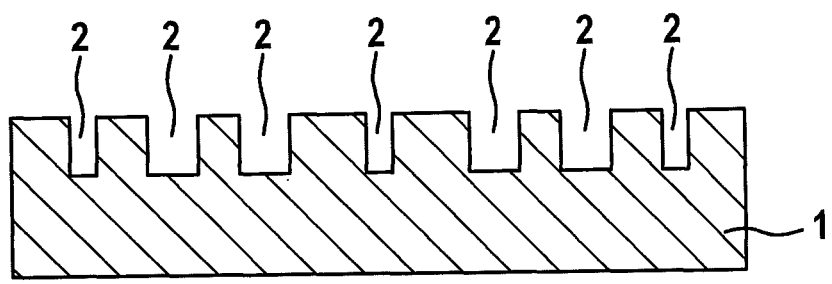
FIG. 1 shows a schematic view of a first intermediate product in the manufacture of a micro-electromechanical reflector according to the present invention in a cross-sectional view.
Figure 2:
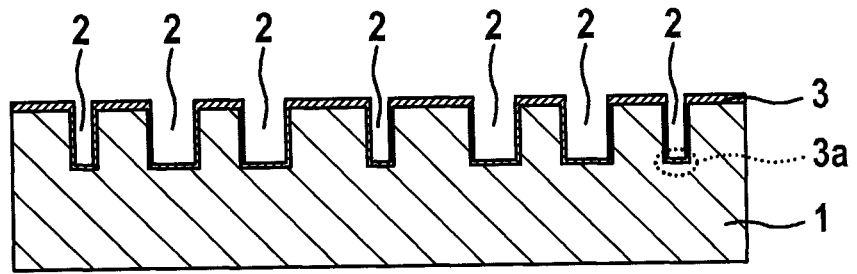
FIG. 2 shows a schematic view of a second intermediate product in the manufacture of a micro-electromechanical reflector according to the present invention in a cross-sectional view.
Figure 3:
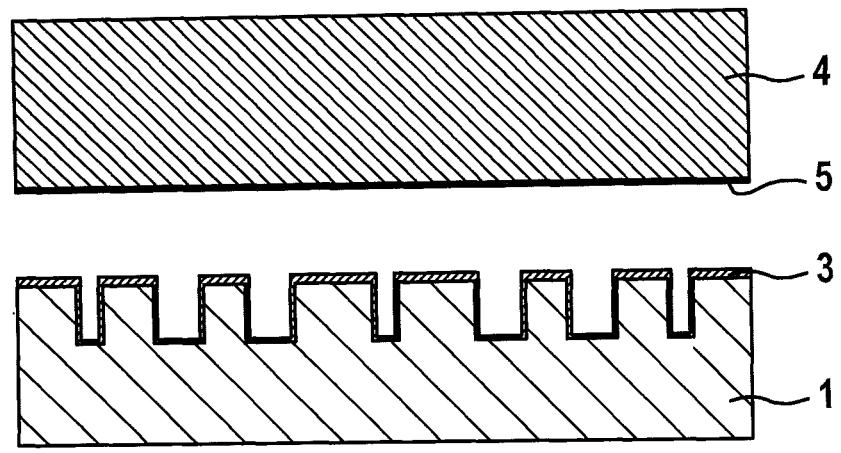
FIG. 3 shows a schematic view of a third intermediate product in the manufacture of a micro-electromechanical reflector according to the present invention in a cross-sectional view.
Figure 4:
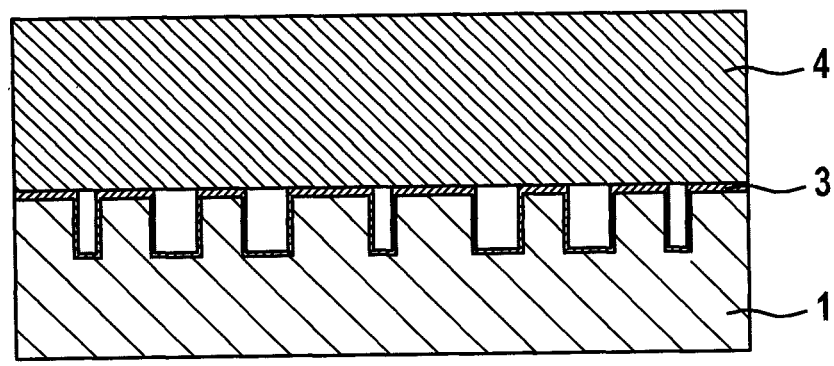
FIG. 4 shows a schematic view of a fourth intermediate product in the manufacture of a micro-electromechanical reflector according to the present invention in a cross-sectional view.
Figure 5:
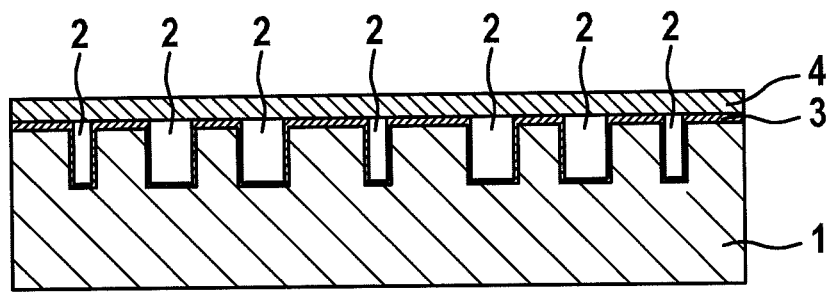
FIG. 5 shows a schematic view of a fifth intermediate product in the manufacture of a micro-electromechanical reflector according to the present invention in a cross-sectional view.

FIG. 1 shows a schematic view of a first intermediate product in the manufacture of a micro-electromechanical reflector in a cross-sectional view. An electrode substrate 1, for example, a monocrystalline silicon substrate, may be provided with a plurality of recesses 2, for example, by vertical etching of rectangular recesses 2. As shown in FIG. 2, an oxide layer 3 may be applied to electrode substrate 1, the walls of first recesses 2, and bottom surfaces 3a of first recesses 2, for example, by oxidizing the substrate material. Then, as shown in FIG. 3, a cover substrate 4 may be bonded as a carrier layer onto electrode substrate 1 from the side of recesses 2. In addition, cover substrate 4 may also be provided with an oxide layer 5. As shown in FIG. 4, cover substrate 4 and electrode substrate 1 are connected in a mechanically stable way, so that thereafter—see FIG. 5—cover substrate 4 may be arbitrarily thinned from the side facing away from electrode substrate 1. In this way, a so-called cavity silicon-on-insulator wafer (cavity SOI wafer) is created, in which recesses 2 are enclosed between electrode substrate 1 and cover substrate 4. Cover substrate 4 or the carrier layer may also be made of a monocrystalline silicon material.

Figure 6:
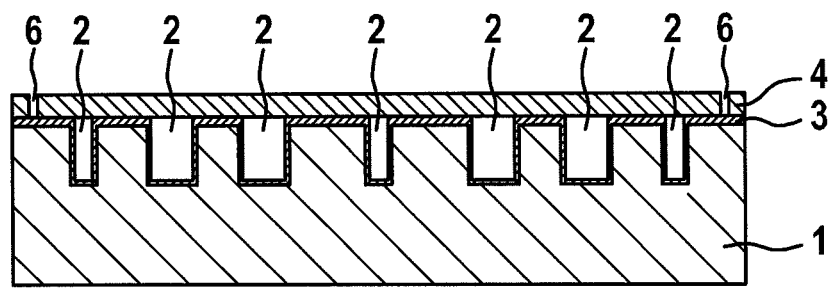
FIG. 6 shows a schematic view of a sixth intermediate product in the manufacture of a micro-electromechanical reflector according to the present invention in a cross-sectional view.
Figure 7:
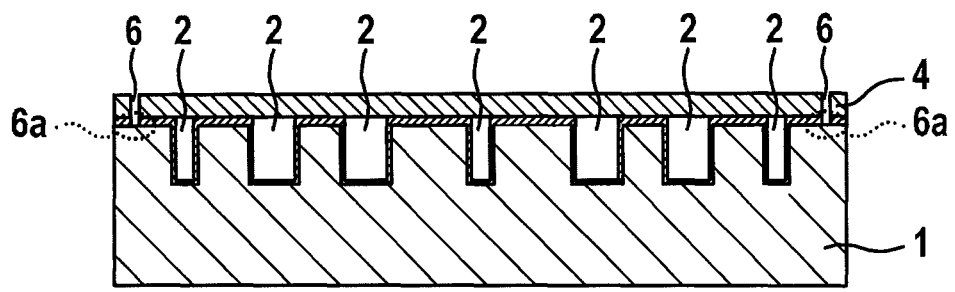
FIG. 7 shows a schematic view of a seventh intermediate product in the manufacture of a micro-electromechanical reflector according to the present invention in a cross-sectional view.
Figure 8:
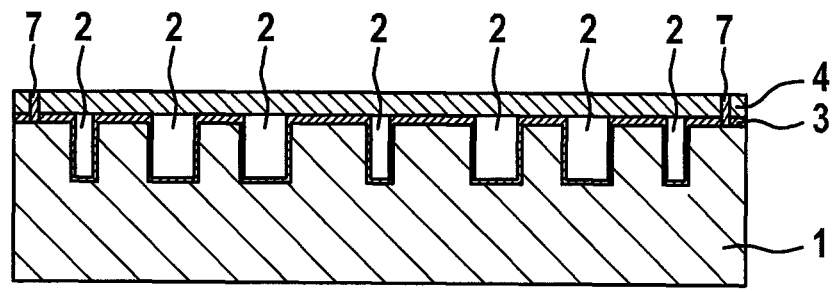
FIG. 8 shows a schematic view of a eighth intermediate product in the manufacture of a micro-electromechanical reflector according to the present invention in a cross-sectional view.

As shown in FIG. 6, vias ("vertical interconnect access") or trenches 6, which extend down to oxide layer 3, may be introduced into carrier layer 4. As shown in FIG. 7, oxide layer 3 may also be etched down to electrode substrate 1 in the area of via bottom or trench bottom 6a.

FIG. 4 shows a schematic view of an intermediate product of a micro-electromechanical reflector. Manufactured vias or trenches 6 are filled using an electrically conductive material 7. If electrode substrate 1 and carrier layer 4 have different doping types, for example, n-doping and p-doping, material 7 may have a metal layer, for example, a layer made of titanium and titanium nitride. A barrier layer 7 may be deposited, on which a tungsten layer is deposited from the chemical gas phase. In contrast, in the case of an identical doping type of electrode substrate 1 and carrier layer 4, it is possible to carry out a deposition of a silicon layer 7 from the chemical gas phase. Silicon layer 7 may be doped during or after the deposition process. This may be carried out, for example, in that in a temperature step, the doping of electrode substrate 1 and carrier layer 4, is introduced into silicon layer 5.

The filled vias may be freed from the excess material layer in a planarization step, so that electrically conductive vias 7 are formed from electrode substrate 1 through oxide layer 3 and carrier layer 4.

Figure 9:
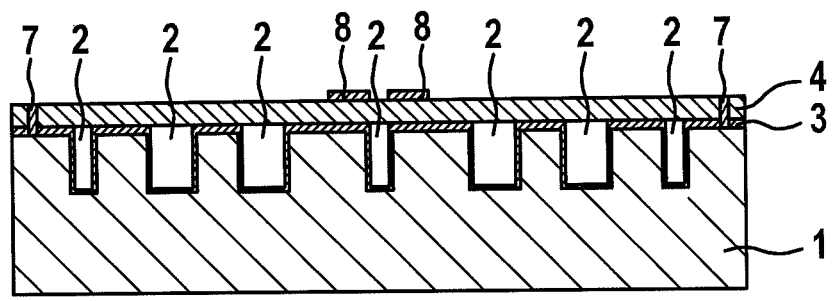
FIG. 9 shows a schematic view of a ninth intermediate product in the manufacture of a micro-electromechanical reflector according to the present invention in a cross-sectional view.

FIG. 9 shows how the reflector surface may be prepared in the area between two vias 7. A reflector surface, for example, a mirror metal, may be deposited directly on carrier layer 4.

As shown in the example of FIG. 9, however, an aluminum layer 8 may also be built up initially in the area between two vias 7, and in particular between two trenches defined by recesses 2, on carrier layer 4. This aluminum layer 8 may then be used for the build-up of a mirror element lying above carrier layer 4, as explained hereafter with reference to FIG. 11.

Figure 10:
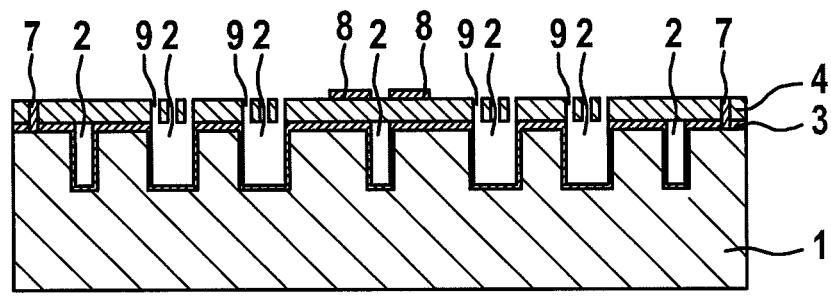
FIG. 10 shows a schematic view of a tenth intermediate product in the manufacture of a micro-electromechanical reflector according to the present invention in a cross-sectional view.

FIG. 10 shows the structuring of carrier layer 4. Torsion spring structures 9, which may have a cross-sectional ratio of width to height which deviates strongly from 1, for example, values of less than 0.5 or greater than 2, for example, are applied. Therefore, improved thermal conductivity characteristics may be achieved with equal torsional rigidity of torsion spring structures 9. Two pairs of torsion spring structures 9 may preferably be formed, whose spring alignments are perpendicular to one another in pairs, so that an inner torsion spring structure 9 defines an inner first electrode area and an outer torsion spring structure 9 defines an outer first electrode area. Torsion spring structures 9 are formed over respective ones of first recesses 2, to provide electrode structures which are freely movable and are only suspended over carrier layer 4. The distance between the pairs of torsion spring structures 9 in carrier layer 4 is to be at least the thickness of oxide layer 3 located underneath, so that in a following etching step of oxide layer 3, a mechanical connection still remains between carrier layer 4 and electrode substrate 1 between torsion spring structures 9.

Figure 11:
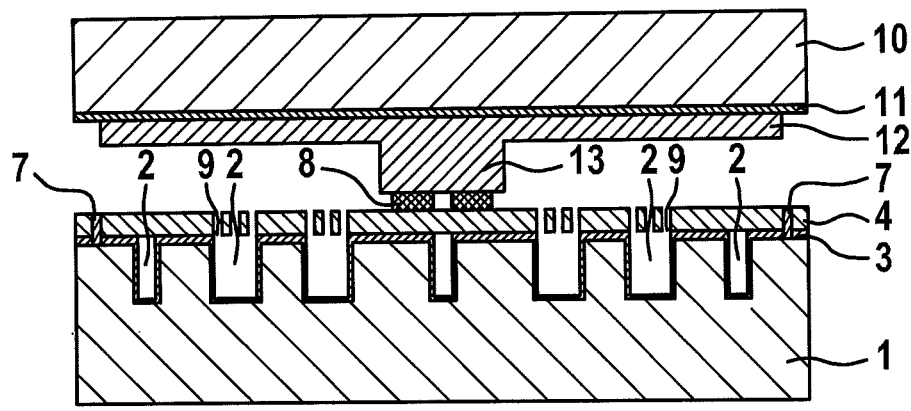
FIG. 11 shows a schematic view of an eleventh intermediate product in the manufacture of a micro-electromechanical reflector according to the present invention in a cross-sectional view.

FIG. 11 shows the bonding of a carrier wafer 10 having an oxide layer 11 and a monocrystalline silicon layer 12 on electrode substrate 1. Carrier wafer 10 may be an SOI wafer, for example. A pedestal or spacer 13, whose surface is also provided with a bonding material, may be provided on this wafer 10. For example, the bonding material may be a directly applied germanium layer on spacer 13. Spacer 13 may also be manufactured from silicon. Monocrystalline silicon layer 12 and spacer 13 may already be pre-structured, so that a release of the movable mirror structures or reflector surfaces may be carried out via a silicon etching process on the top side of carrier wafer 10 with subsequent isotropic oxide etching. As shown in FIG. 11, the bonding of the bonding material of carrier wafer 10 to bonding material 8 produces a solid bond between electrode substrate 1 and carrier wafer 10. In the case of an aluminum layer as bonding material 8 and a germanium layer as the bonding material of carrier wafer 10, silicon may diffuse into the aluminum-germanium bond and advantageously increase the melting temperature of resulting bond 8.

Figure 12:
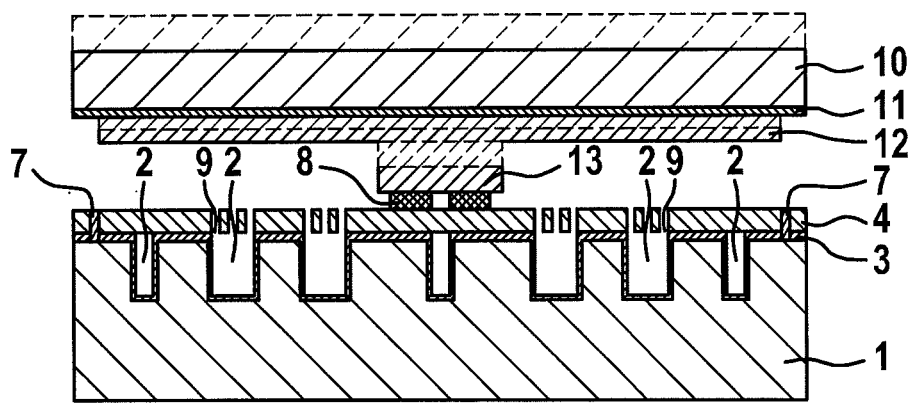
FIG. 12 shows a schematic view of a twelfth intermediate product in the manufacture of a micro-electromechanical reflector according to the present invention in a cross-sectional view.
Figure 13:
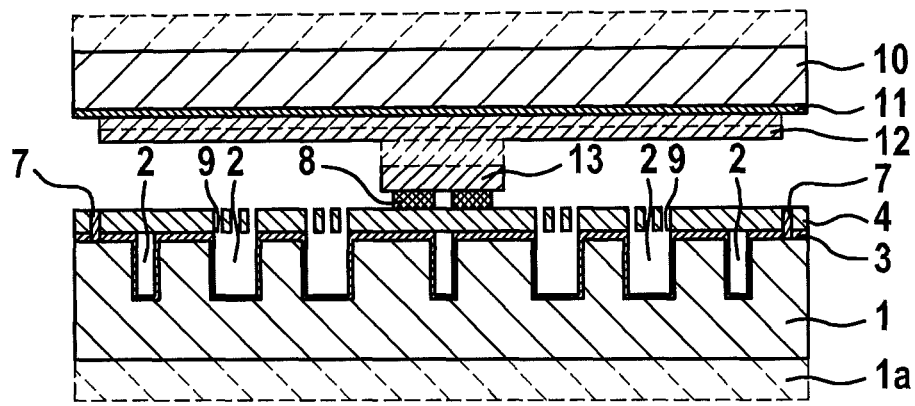
FIG. 13 shows a schematic view of a thirteenth intermediate product in the manufacture of a micro-electromechanical reflector according to the present invention in a cross-sectional view.
Figure 14:
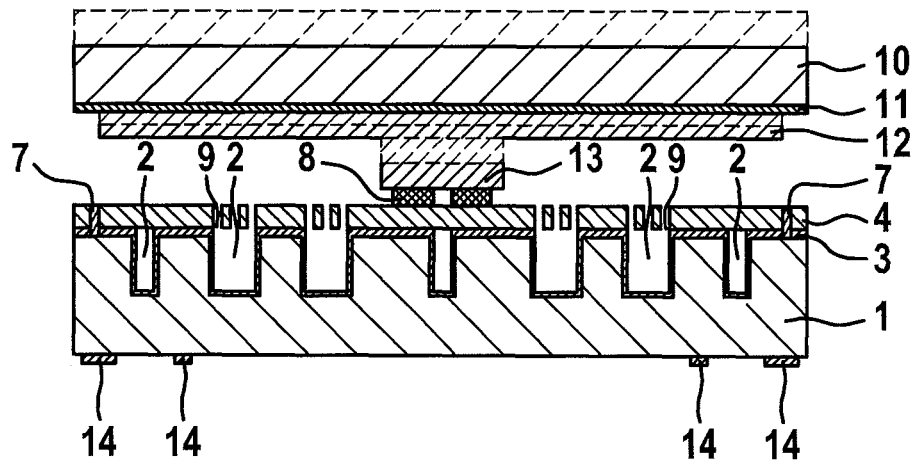
FIG. 14 shows a schematic view of a fourteenth intermediate product in the manufacture of a micro-electromechanical reflector according to the present invention in a cross-sectional view.

After the thinning of carrier wafer 10 from the top side shown in FIG. 12 and the thinning of electrode substrate 1 from the bottom side in area 1a shown in FIG. 13, bonding surfaces 14 may be prepared on the rear side or bottom side of electrode substrate 1, for example, via a structured aluminum layer 14, as schematically indicated in FIG. 14.

Figure 15:
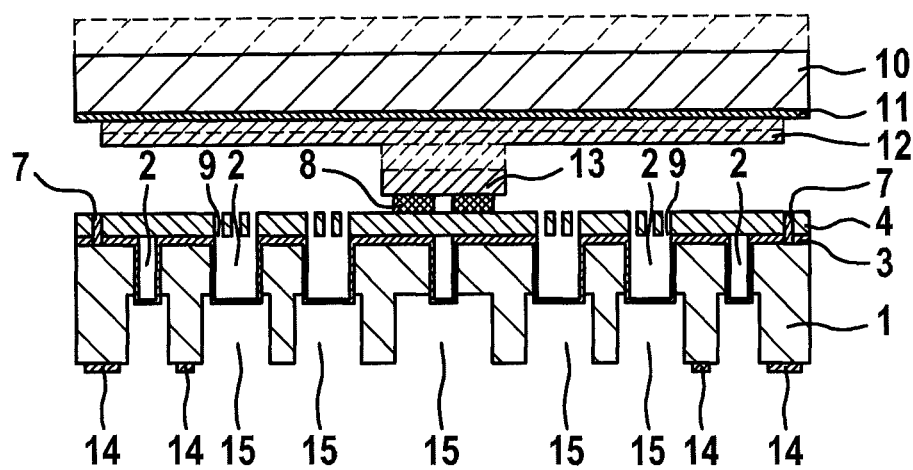
FIG. 15 shows a schematic view of a fifteenth intermediate product in the manufacture of a micro-electromechanical reflector according to the present invention in a cross-sectional view.

FIG. 15 shows a schematic view of the etching process, using which second electrode recesses 15 are introduced into electrode substrate 1. Second electrode recesses 15 are etched in particular directly below torsion spring structures 9, to release the middle region between two torsion spring structures 9 from remaining electrode substrate 1. Second electrode recesses 15 are deeply etched in such a way that a breakthrough to adjacent first recesses 2 results on respective opposing points within the electrode substrate. A first vertical electrode, which is movably mounted in electrode substrate 1 via torsion spring structures 9, thus results in electrode substrate 1. The first vertical electrode is electrically conductively connected at the surface via oxide layer 3 to carrier layer 4 on electrode substrate 1.

On the one hand, inner first electrodes between inner torsion spring structures 9 and, on the other hand, outer first electrodes outside inner torsion spring structures 9 and inside outer torsion spring structures 9 may be formed by second electrode recesses 15. The outer first electrodes are preferably formed as a frame structure, which encloses the inner first electrodes, so that the inner first electrodes are gimbal-mounted on the frame formed by the outer first electrodes via inner torsion spring structures 9 and outer torsion spring structures 9.

Second electrode recesses 15 may be selected in their dimensions in such a way that offset geometries for the formed electrodes are created within electrode substrate 1. These offset geometries decrease the mass of the electrodes, on the one hand, and may be used as free spaces for comb structures to be provided in the bottom area, i.e., the area of the electrodes facing away from carrier layer 4, on the other hand. Second electrode recesses 15 are designed in such a way that at least one first comb structure and at least one second comb structure are formed.

Further second electrode recesses 15 may be formed in the border area of electrode substrate 1, to form second outer electrodes, which are mechanically fixedly anchored to carrier layer 4, the outer electrodes being situated vertically spaced apart from the inner electrodes on the side of the second electrode facing away from the inner electrodes. The first comb structure is coupled to the inner electrode and the second comb structure is coupled to the outer electrode.

Figure 23:
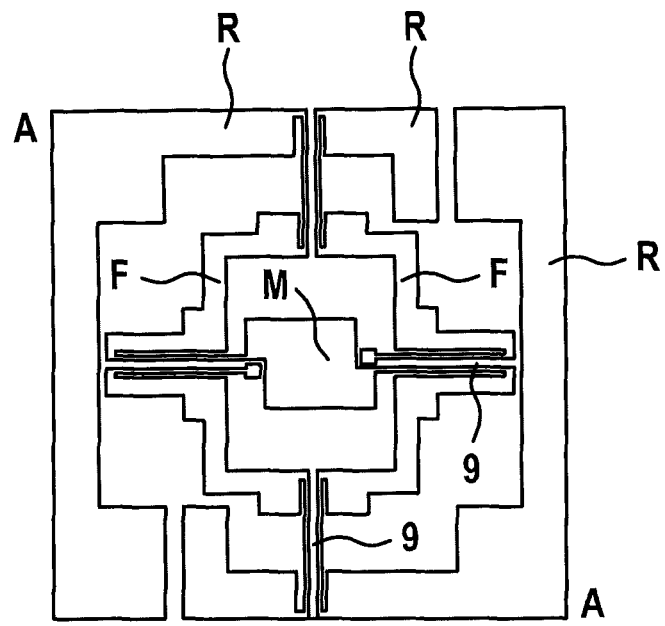
FIG. 23 shows a schematic view of a first sectional plane of a micro-electromechanical reflector according to the present invention in a top view.
Figure 24:
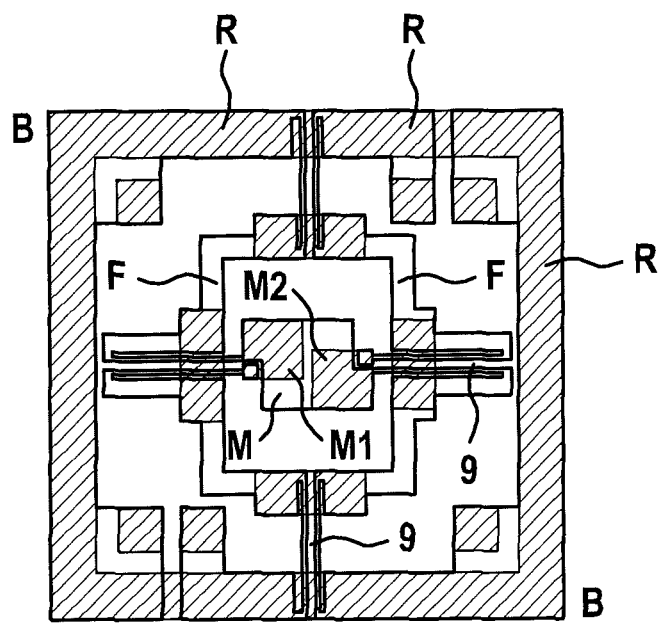
FIG. 24 shows a schematic view of a second sectional plane of a micro-electromechanical reflector according to the present invention in a top view.
Figure 25:
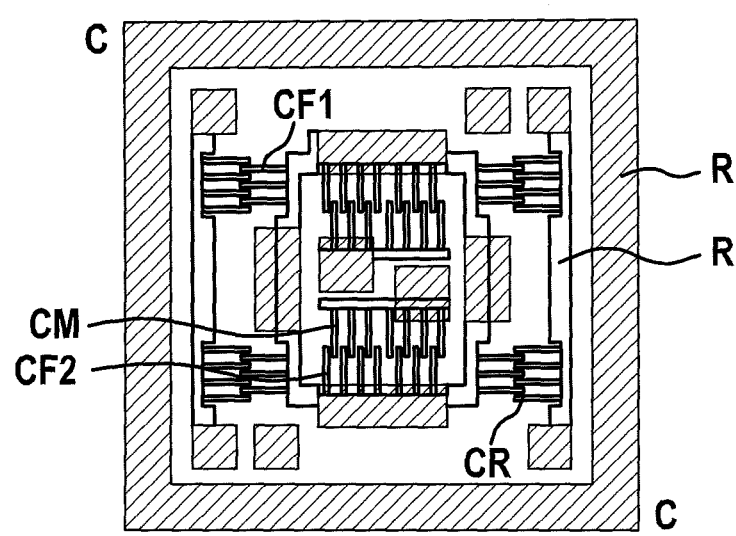
FIG. 25 shows a schematic view of a third sectional plane of a micro-electromechanical reflector according to the present invention in a top view.

The first and second comb structures have a plurality of comb elements, which are interlocked in the electrode substrate plane and are situated vertically in relation to the electrode substrate plane and spaced apart from one another, as described in greater detail hereafter with reference to FIGS. 23, 24, and 25.

Figure 16:
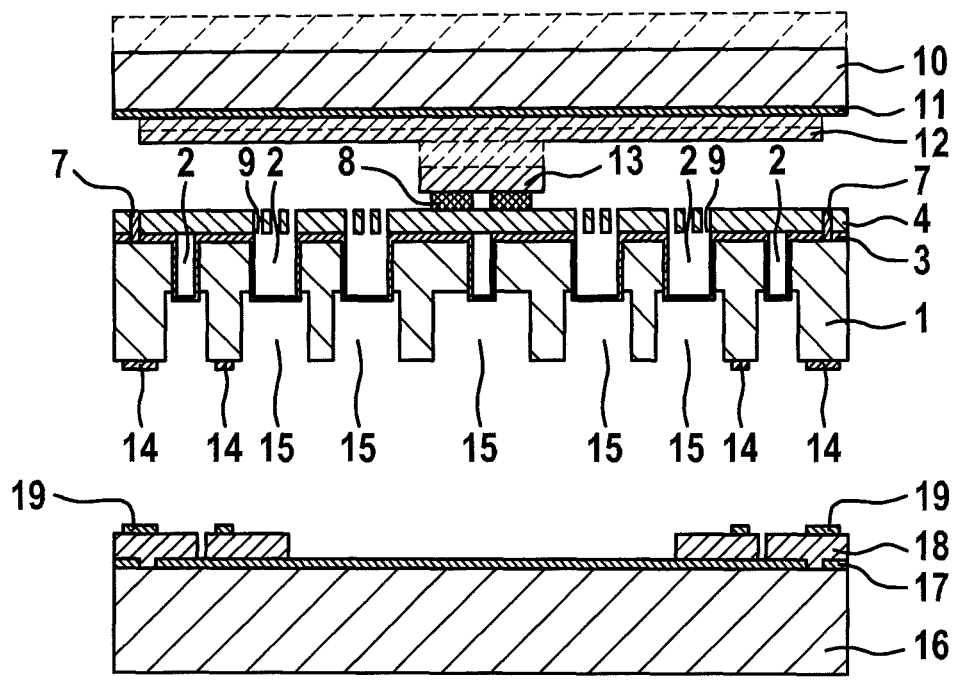
FIG. 16 shows a schematic view of a sixteenth intermediate product in the manufacture of a micro-electromechanical reflector according to the present invention in a cross-sectional view.
Figure 17:
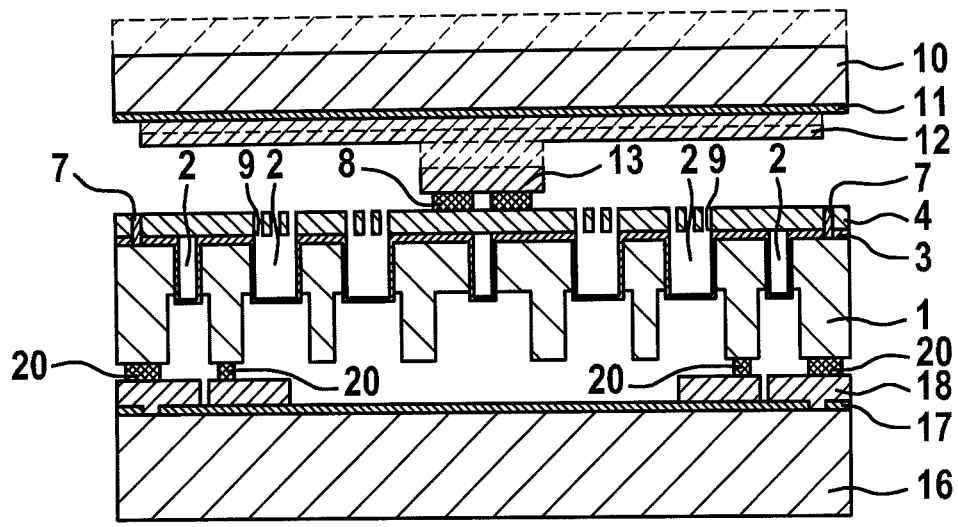
FIG. 17 shows a schematic view of a seventeenth intermediate product in the manufacture of a micro-electromechanical reflector according to the present invention in a cross-sectional view.

FIG. 16 shows the subsequent application of an oxide layer 17 to a carrier substrate 16 and a polysilicon layer 18 to the surface of electrode substrate 1 facing away from carrier layer 4. For example, an SOI wafer may be used for carrier substrate 16. Electrode substrate 1 and carrier substrate 16 may also be connected via a bonding process, in that metallization 19, for example, germanium layers 19, which are applied to polysilicon layer 18, are bonded to bonding surfaces 14, for example, aluminum layers 14. A metallic bonding method may be used for this purpose, which, for example, in the case of aluminum-germanium bonds 20—as shown in FIG. 17—results in diffusion of silicon from carrier substrate 16 into the bond and an increase of the melting temperature resulting therefrom. The bond thus advantageously does not melt a second time in further temperature steps.

Figure 18:
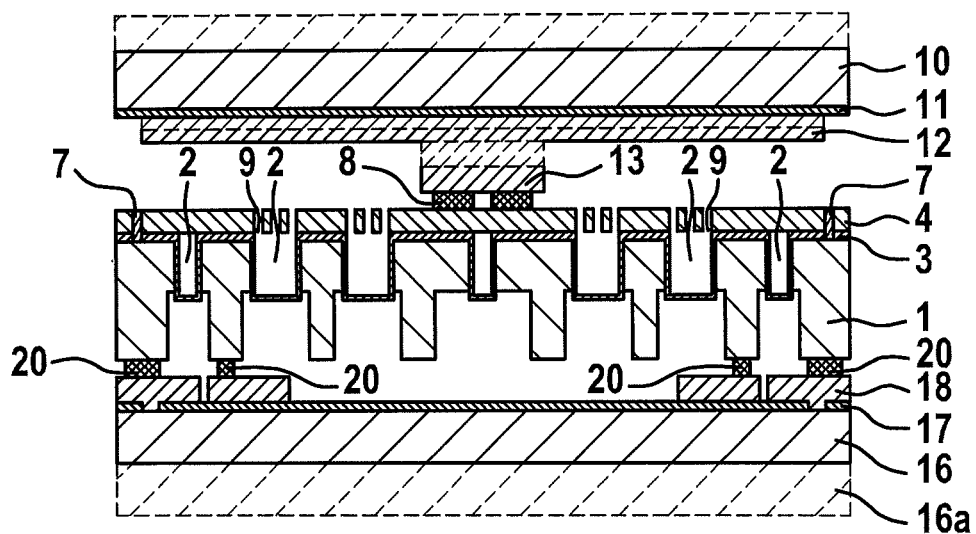
FIG. 18 shows a schematic view of an eighteenth intermediate product in the manufacture of a micro-electromechanical reflector according to the present invention in a cross-sectional view.
Figure 19:
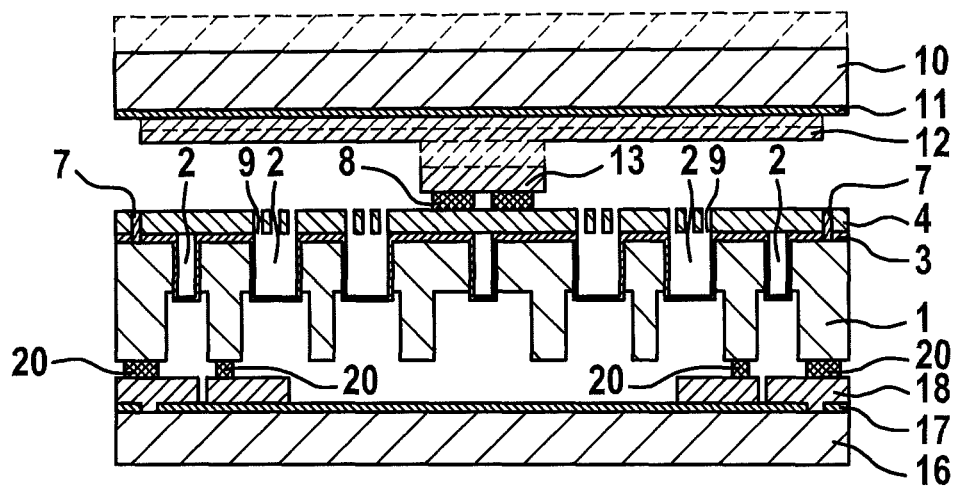
FIG. 19 shows a schematic view of a nineteenth intermediate product in the manufacture of a micro-electromechanical reflector according to the present invention in a cross-sectional view.

In particular, one of the vertical outer electrodes is electrically and mechanically connected to carrier substrate 16 and stably and immovably connected in relation to electrode substrate 1 by the bonding of bond 20. Polysilicon layer 18 may be structured in such a way that adjacent outer electrodes and optionally introduced auxiliary electrodes are electrically separated from one another, and the area below the movable first electrode is released from polysilicon layer 18. Oxide layer 17 may optionally also be suitably structured, to release the movable inner electrode in electrode substrate 1 to ensure maximum mobility. FIGS. 18 and 19 show the (optional) thinning of carrier substrate 16 from the bottom side facing away from electrode substrate 1.

Figure 20:
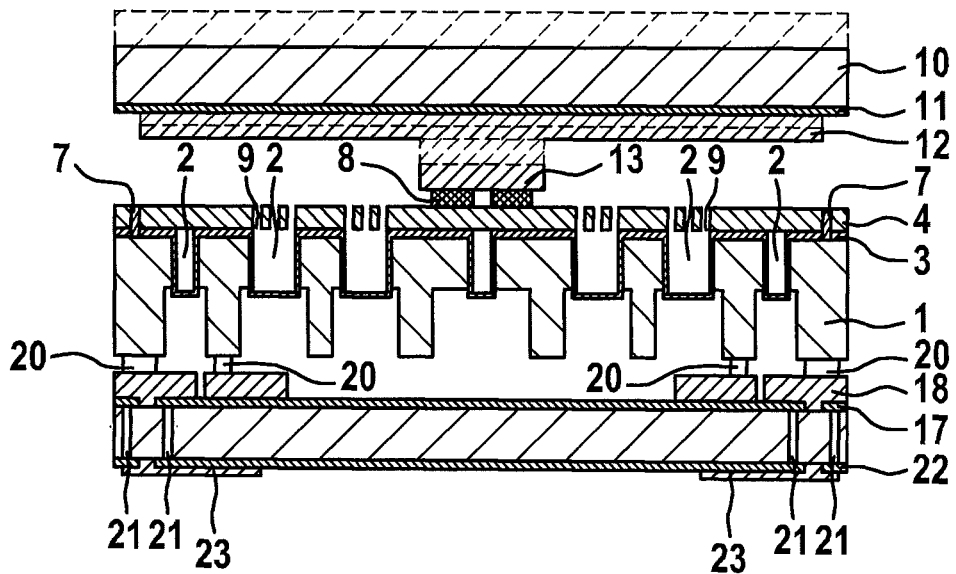
FIG. 20 shows a schematic view of a twentieth intermediate product in the manufacture of a micro-electromechanical reflector according to the present invention in a cross-sectional view.

FIG. 20 shows the implementation of electrical vias 23 having corresponding trenches 21 in carrier substrate 16. Electrical signals of the electrodes may be conducted from silicon layer 18, which is situated on carrier substrate 16, through carrier substrate 16 to the bottom side of carrier substrate 16 via electrical vias 23, which are silicon vias 21, 23 in the example of FIG. 20. Silicon vias 21, 23 may be formed in a further oxide layer 22 on the bottom side of carrier substrate 16, on which rewirings may then be formed in a rewiring level, as shown in FIG. 20. The application of silicon vias may be carried out similarly as described in the publication DE 10 2009 045 385 A1. It is favorable if, in particular in the area of the stationary electrodes, silicon layer 18 overlaps the area of silicon vias 21, 23 up into the carrier substrate areas of carrier substrate 16. The overlap may be selected as sufficiently large, at least at one point, so that oxide layer 17 also still overlaps carrier substrate 16 in this area. This ensures a high mechanical stability of the stationary electrodes. The overlap may also be formed to be sufficiently large around silicon vias 21, 23 so that the mirror-side surface of electrode substrate 1 is completely and hermetically separated from the bottom side area of carrier substrate 16, so that the activation electronic system on the bottom side of carrier substrate 16 remains protected as best as possible.

Figure 21:
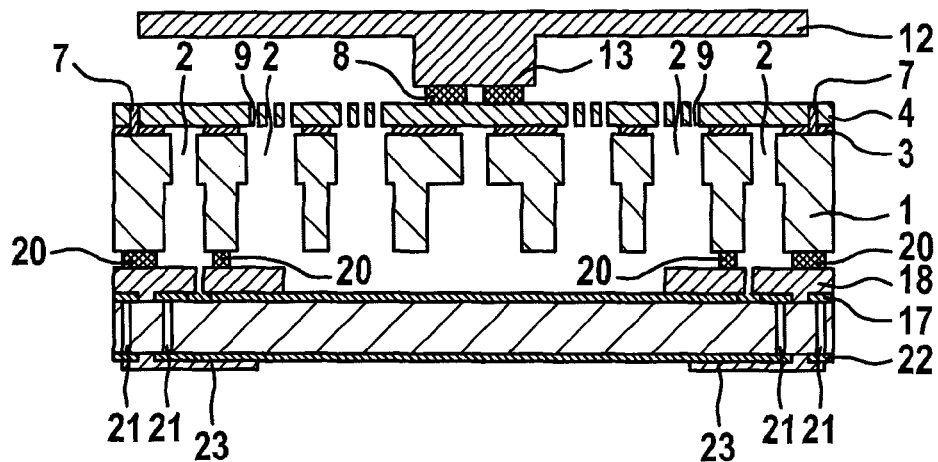
FIG. 21 shows a schematic view of a twenty-first intermediate product in the manufacture of a micro-electromechanical reflector according to the present invention in a cross-sectional view.

After the application of carrier substrate 16, the stack is sufficiently mechanically stabilized to remove carrier wafer 10, for example, via an etching process, as shown in FIG. 21. Exposed oxide layer 11 may then be removed via a gas phase etching process using hydrofluoric acid to ensure a preferably clean and smooth mirror surface on mirror element 12—as shown in FIG. 21—on which a reflector surface may then be applied.

Single reflectors and also reflector arrays may be manufactured using the described process sequence.

Figure 22:
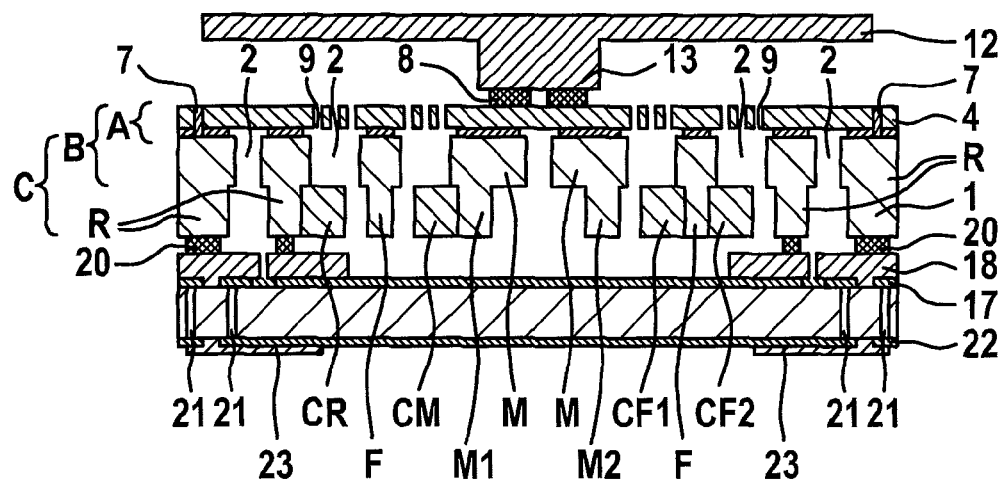
FIG. 22 shows a schematic view of a micro-electromechanical reflector according to the present invention in a cross-sectional view.

FIG. 22 shows an example of movable inner first electrode M, movable outer first electrodes F, stationary second electrodes R, and optionally provided auxiliary electrodes m in the outer area of electrode substrate 3. A torsion of electrode M around a torsion axis, which extends in parallel to the substrate plane of electrode substrate 3 and in carrier layer 4, may take place via the application of a voltage between inner first electrode M and outer first electrode F, so that a corresponding torsion of mirror element 12 or the reflector surface results. A preferably great tilting freedom of mirror element 12 is ensured by spacer 13. In addition, mirror element 12 is designed in such a way that it protrudes beyond the area of the movable electrodes, to provide a preferably large reflector surface. Similarly, a torsion of the gimbal frame, which is provided by outer first electrodes F, around a torsion axis of outer torsion spring structures 9, which extends in parallel to the substrate plane of electrode substrate 3 and in carrier substrate 4, and which is perpendicular to inner torsion spring structures 9, may take place via the application of a voltage between outer first electrode F and second electrode R.

FIG. 23 shows a schematic view of the reflector in FIG. 22 in the area of the top sectional region shown in FIG. 22, i.e., along electrode substrate plane A. Inner first electrode M is shown, which is coupled via inner torsion spring structures 9 on outer first electrode F. Outer first electrode F is in turn coupled via outer torsion spring structures 9 on second electrodes R. A gimbal frame thus results around inner first electrode M, via which the reflector surface may be tilted in two dimensions.

FIG. 24 shows a schematic view of the reflector in FIG. 22 in the area of the middle sectional region shown in FIG. 22, i.e., along electrode substrate plane B. Inner first electrode M has tapered bottom electrode sections M1 and M2. Outer first electrodes F and second electrodes R may also be tapered or structured suitably as needed in their bottom electrode area, to provide space for the comb structures coupled to the particular electrodes.

FIG. 25 shows a schematic view of the reflector in FIG. 22 in the area of the bottom sectional region shown in FIG. 22, i.e., along electrode substrate plane C. Comb structures CM having a plurality of comb elements are coupled to inner first electrode M, which are engaged with a plurality of comb elements of comb structure CF2, which are coupled to outer first electrode F and are oriented into the interior of the suspension frame formed by outer first electrode F. A further plurality of comb elements of comb structures CF1, which are coupled to outer first electrode F and are oriented outward in the suspension frame formed by outer first electrode F, are engaged with a plurality of comb elements of comb structures CR, which are coupled to second electrodes R. In other words, comb structures CM and CF2 or CF1 and CR are each interlocked and are situated spaced apart from one another and vertically in relation to electrode substrate plane C. Therefore, combs having small intervals between the individual comb elements are implemented, whereby the effective electrode surface area between comb structures CM, CF1, CF2, and CR is enlarged. The comb structures may be wired flexibly, i.e., brought to different electrical potentials, via the selective electrical connection between electrodes M, F, and R and carrier layer 4 with the aid of the electrically conductive vias 7.

What is claimed is:

1. A micro-electromechanical reflector, comprising:
   an electrode substrate having a first surface and a second surface opposite to the first surface;
   a carrier layer situated on a first surface of the electrode substrate;
   a plurality of first electrode recesses located under the carrier layer from the first surface into the electrode substrate;
   a plurality of second electrode recesses introduced from a second surface of the electrode substrate into the electrode substrate;
   at least one torsion spring structure formed in the carrier layer over one of the first electrode recesses;
   a carrier substrate attached to the second surface of the electrode substrate;
   a reflector surface situated on the carrier layer;
   at least one first electrode movably mounted in the electrode substrate via the torsion spring structure;
   at least one second electrode mechanically fixedly anchored to at least one of the carrier substrate and the carrier layer, wherein the first electrode and the second electrode are formed by the first and second electrode recesses;
   at least one first comb structure; and
   at least one second comb structure, wherein:
      the first comb structure and the second comb structure are formed by the second electrode recesses;
      the first comb structure is coupled to the first electrode and the second comb structure is coupled to the second electrode;
      the first and second comb structures include a plurality of comb elements that are interlocked in an electrode substrate plane and are situated spaced apart from one another and vertically in relation to the electrode substrate plane; and
      the carrier substrate is connected to the electrode substrate via a metallic bonding material.

2. The micro-electromechanical reflector as recited in claim 1, further comprising:
   an oxide layer implemented between the carrier layer and the electrode substrate; and at least one electrically conductive via through the carrier layer and the oxide layer, via which at least one of the first and second electrodes are each electrically conductively connected to the carrier layer.

3. The micro-electromechanical reflector as recited in claim 1, wherein electrical vias are implemented from a surface of the carrier substrate facing away from the electrode substrate through the carrier substrate up to the metallic bonding material.

4. The micro-electromechanical reflector as recited in claim 3, wherein the carrier substrate has, as electrical vias, silicon vias and an oxide layer on the surface facing the electrode substrate, which extends in the area of the silicon vias laterally beyond an extension of the silicon vias onto the carrier substrate.

5. The micro-electromechanical reflector as recited in claim 1, wherein at least two first electrodes are implemented in the electrode substrate, a first of the first electrodes forms a frame structure, within which a second of the first electrodes forms an electrode which is gimbal-mounted via two torsion spring structures.

6. The micro-electromechanical reflector as recited in claim 5, further comprising:
    at least one third comb structure; and
    at least one fourth comb structure, wherein the third and fourth comb structures are formed by the electrode recesses, wherein:
        the first comb structure is coupled to a first of the first electrode,
        the second comb structure is coupled to a second of the first electrode, and
        the third and fourth comb structures have a plurality of comb elements that are interlocked in the electrode substrate plane and are situated spaced apart from one another and vertically in relation to the electrode substrate plane.

7. The micro-electromechanical reflector as recited in claim 1, further comprising:
    a further metallic bonding material;
    a spacer connected to the further metallic bonding material; and
    a mirror element situated on the spacer, wherein the further metallic bonding material, the spacer, and the mirror element are applied to the carrier layer, and wherein the reflector surface is applied to a side of the mirror element facing away from the spacer.

8. The micro-electromechanical reflector as recited in claim 7, wherein the mirror element includes a lateral extension that extends beyond the torsion spring structure in the substrate plane of the electrode substrate.

9. The micro-electromechanical reflector as recited in claim 1, wherein at least one of the carrier substrate and the electrode substrate has SOI substrates.

10. A method for manufacturing a micro-electromechanical reflector, comprising:
    forming a plurality of first electrode recesses from a first surface into an electrode substrate;
    attaching a carrier layer to the first surface of the electrode substrate over the plurality of first electrode recesses;
    forming at least one torsion spring structure in the carrier layer;
    attaching, via a metallic bonding material, a carrier substrate to a surface of the electrode substrate facing away from the carrier layer;
    forming a plurality of second electrode recesses from a second surface into the electrode substrate, so that at least one first electrode, which is movably mounted in the electrode substrate via the torsion spring structure;
    forming at least one second electrode, which is mechanically fixedly anchored to at least one of the carrier substrate and the carrier layer, by the first and second electrode recesses;
    forming at least one first comb structure and at least one second comb structure are formed by the second electrode recesses;
    coupling the first comb structure to the first electrode;
    coupling the second comb structure to the second electrode, wherein the first and second comb structures having a plurality of comb elements, which are interlocked in an electrode substrate plane and are situated spaced apart from one another and vertically in relation to the electrode substrate plane; and
    applying a reflector surface over the carrier layer.

* * * * *